April 26, 1960 J. SCHUTT 2,934,456
PROCESS FOR THE PRODUCTION OF DIFFUSION RESISTANT COATINGS
Filed March 25, 1957
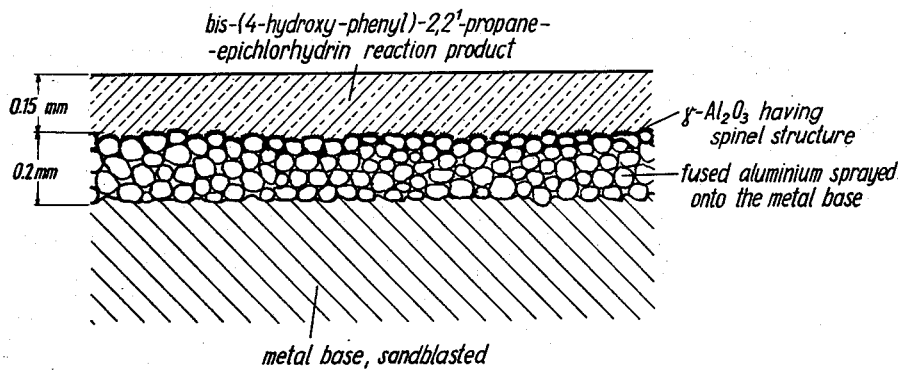
INVENTOR.
J. Schutt

United States Patent Office 2,934,456
Patented Apr. 26, 1960

2,934,456

PROCESS FOR THE PRODUCTION OF DIFFUSION RESISTANT COATINGS

Josef Schutt, Vienna, Austria

Application March 25, 1957, Serial No. 647,964

Claims priority, application Austria August 14, 1956

9 Claims. (Cl. 117—75)

The invention relates to a process for the production of protective coatings or covers for supports or members of all kinds, and particularly to the production of anti-corrosion protective coatings for metallic supports and members.

Many different materials have already been proposed for use as protective coatings, such as metals of low melting point, varnishes, plastics or synthetic resins and the like. The recently evolved so-called "epoxide resins," which are products of reaction between bis(4-hydroxyphenyl)2,2'-propane (diphenylol-propane) and epichlorhydrin and having two terminal epoxide groups, are of particular interest as covering materials, as this kind of plastic or synthetic resin exhibits a high degree of resistance to chemicals and corrosive liquids, in particular to sea water, and also exhibits a high resistance to heat. By virtue of these properties the epoxide resins are particularly suitable for use as coating materials for ships, steam kettles, water kettles as well as for hot water pipes, central heating equipment and the like, which fields are not covered by other artificial or synthetic materials.

The general use of epoxide resins of this kind for the given technical range of application has, however, been confronted with the difficulty caused by their limited resistance to diffusion. It has repeatedly been shown that the adhesion of epoxide layers on supports, as for example sheet iron, sheet aluminum or the like common production materials, is sufficient or inadequate in the presence of water, so that the advantageous properties of the epoxide resins are not displayed to advantage because of the early detaching or loosening of the coating from the support which is explained by the fact that water diffuses through the coating.

It is an object of the present invention to avoid these difficulties and to make it possible to produce coatings based on bis(4 - hydroxyphenyl)2,2'-propane-epichlorhydrin reaction products comprising two terminal epoxide groups which adhere strongly to supports of all kinds, particularly to metallic supports, which coatings are particularly distinguished by their diffusion resistance.

It has been found that the crystalline structure of the surface of the support is an essential factor in the adherence and diffusion-resistance of coatings based on bis(4 - hydroxyphenyl)2,2'-propane-epichlorhydrin reaction products having two terminal epoxide groups. The process according to the invention consists in that before applying the varnish or lacquer of the said epoxide resin type which may be effected by spraying, dipping, painting by means of brushes or the like, the surface of the support is to be provided with an adhesion layer or film which has a crystalline structure of the type possessed by spinels which have a lattice constant of approximately from 8 to 8.5.

According to the general conception of the invention, there are many ways of carrying the invention into effect, all of which have the common characterising feature of providing an adhesion layer or film of the said kind on the surface of the support, body or member to which the epoxide resin is to be applied. The adhesion layer or film may be relatively thick, for example 0.2 mm; it may also be very thin, for example, it may be only a monomolecular layer.

Many different ways are known for producing a layer having a spinel crystal structure. Generally, spinels may be of the general composition indicated by the formula $A_2BO_4$, in which the symbols A and B signify metals which are tervalent and bivalent respectively and the symbol O represents oxygen. Examples of the spinels are the aluminium spinels $Al_2(BO_4)$, particularly $Al_2(ZnO_4)$, $Al_2(MnO_4)$, $Al_2(FeO_4)$, $Al_2(CoO_4)$, $Al_2(CuO_4)$ and the like, the iron spinels $Fe_2(BO_4)$, such as $Fe_2(ZnO_4)$, $Fe_2(MnO_4)$, $Fe_2(CuO_4)$, $Fe_2(NiO_4)$, $Fe_2(CoO_4)$ and the like, the chromium spinels $Cr_2(BO_4)$, such as $Cr_2(MgO_4)$, $Cr_2(ZnO_4)$, $Cr_2(FeO_4)$ and the like. The metals A and B given in the general formula for the spinels may be different metals as illustrated in the above examples; they may also indicate the same metal if this metal can be bivalent as well as tervalent. A particularly important example for the purposes of the invention is $Fe_2(FeO_4)$. All of the given examples of spinels have a lattice constant of approximately from 8 to 8.5. The lattice constants of some of the spinels hereinbefore referred to are given in the following table:

| Spinel: | Lattice constant $a$ |
|---|---|
| $Al_2(ZnO_4)$ | 8.10 |
| $Al_2(MnO_4)$ | 8.26 |
| $Al_2(FeO_4)$ | 8.12 |
| $Al_2(MgO_4)$ | 8.09 |
| $Fe_2(MgO_4)$ | 8.34 |
| $Fe_2(MnO_4)$ | 8.57 |
| $Fe_2(ZnO_4)$ | 8.40 |
| $Fe_2(FeO_4)$ | 8.41 |
| $Fe_2(NiO_4)$ | 8.41 |
| $Fe_2CoO_4)$ | 8.39 |
| $Cr_2(MgO_4)$ | 8.29 |
| $Cr_2(ZnO_4)$ | 8.32 |
| $Cr_2(FeO_4)$ | 8.36 |

There are also known spinels of simple oxide composition, for example, $\gamma$-$Fe_2O_3$ having a lattice constant of 8.40 and $\gamma \cdot Al_2O_3$ having the lattice constant of 7.90. Synoptical tables of these and other known spinels are given by D'Ans-Lax in "Taschenbuch für Chemiker und Physiker" 1953, page 175.

An advantageous method for producing an adhesion layer on a support according to the invention consists in spraying a metal in liquid form on to the support in the presence of oxygen, whereby the liquid metal forms with oxygen, oxides of the spinel crystal type. Thus, according to the invention, liquid aluminium may be sprayed on to any support, the aluminium forming together with atmospheric oxygen $\gamma$-$Al_2O_3$. The adhesion layer so formed is of spinel character and is suitable for the application thereon of diffusion-resistant, epoxide resin layers.

It is also possible to form iron oxide adhesion layers instead of aluminium oxide adhesion layers by applying molten iron to the surface of the support in which case the iron reacts with oxygen to form $\gamma$-$Fe_2O_3$ which has a spinel structure. However, this method can only be employed when the support used is not adversely affected by the heat or temperature of the liquid iron which is sprayed thereon. Generally, aluminium will be preferred in view of its low melting temperature and the simplicity of the means or apparatus for the spraying or metallization. However, it will be understood that other metals may be used to form, according to the process of spraying or metallization, oxide adhesion layers of spinel crystalline structure. Thus, for example, other than aluminium itself, different aluminium alloys, such as aluminium-magnesium, aluminium-zinc and aluminium-manganese, as well as iron and manganese, may be used in the manner hereinbefore described.

Adhesion layers of spinel crystalline structure may also be produced by pickling or blanching metallic supports, such as iron and aluminium, with oxidising liquids, particularly nitric acid. The pickling process may be carried out either in the hot or in the cold; suitable concentrations are from 0.1 to 2 moles $HNO_3$ per litre. The duration of the pickling process may be approximately 1 hour when caried out in the cold, whilst in the hot the duration of the pickling process may be from 5 to 10 minutes, until spinel layers are formed which are suitable as adhesion layers. The formation of the desired spinels with a lattice constant of approximately from 8 to 8.5 can be assured by the addition of particular metal nitrates to the pickling solution. However, it is to be observed that in the pickling treatment no metallic salt is to be added, which is, in the pickling solution, more electropositive than the metal support; otherwise a galvanic metalic precipitate or deposit would be formed on the metal support which would prevent or hinder the formation of a spinel adhesion layer. If necessary or desired, in such a case an electrical inverse or counter potential or voltage may be applied to the metal support to prevent or hinder such formation of a galvanic precipitate.

If a spinel adhesion layer is to be produced on iron by pickling, the best method of carrying it out is to use nitric acid of the given concentration of from 0.1 to 2 moles per litre and to add zinc nitrate to the pickling solution, advantageously in a ratio of 2 moles $HNO_3$ to 1 mole $Zn(NO_3)_2$, whereby the iron spinel $Fe_2(ZnO_4)$ is formed on the surface of the iron, the iron spinel having a lattice constant of 8.40. Instead of zinc nitrate another metal nitrate may be used which is capable of reacting with iron to form iron spinels, such, for example, as manganese nitrate, magnesium nitrate and the like. In this way it is readily possible to adjust or control the lattice constant of the said spinel layer. It has been found that the lattice constant of the spinel to be produced should correspond as nearly as possible with the distance of the polar phenol ether bonding of the bis(4-hydroxyphenyl)-2,2'-propane molecules, in order to obtain the optimum diffusion-resistance.

The pickling treatment is particularly advantageous for aluminium and aluminium alloy supports. With iron and steel supports, the pickling treatment is mainly applied in the case of cold-rolled sheets and oxide-free steels which are free from magnetic oxide (magnetite) inclusions. In othe rcases, iron and steel supports are in general preferably treated by spraying or metallization with molten aluminium.

After the pickling or like treatment, the treated surfaces are well washed with water and then dried, whereupon the epoxide resin coatings are applied in known manner.

The layers or coatings of epoxide resin which, according to the invention, can be applied on the supports provided with an adhesion layer, are condensation reaction products of bis(4-hydroxyphenyl)-2,2'-propane with epichlorhydrin. Such resins are available commercially; for example, they are sold by the Shell Company under the trade name of "Epikote." They are soluble in organic solvents such, for example, as glycollic ether (Glykolaether), ketones, mixtures of aromatic hydrocarbons and alcohols, and, after addition of known crosslinking agents, such as organic amines, condensation of formaldehyde with urea, phenol and the like, they are applied on the adhesion layer provided in accordance with the invention by brushing or spraying and then hardened at room or elevated temperature.

The invention is illustrated in the following examples:

*Example 1*

The surface of a container or boiler of hot-rolled boiler plates or sheets, which contained oxidic inclusions of $Fe_3O_4$ at the surface, was cleaned by sandblasting. With the use of a propane-oxygen combustion gas mixture, aluminium was then sprayed on the surface to give a layer of a thickness of from 0.2 to 2 mm. The surface layer so produced consisted substantially of $\gamma$-$Al_2O_3$ with a spinel crystalline structure. The lattice constant was 7.90. In addition, the surface layer contained a small amount of $Al_2(AlO_4)$. Upon the adhesion layer so produced, four coatings of an air-drying and amine-hardening epoxide resin varnish were applied. After an uninterrupted period of operation of six months at boiling temperature, the boiler showed no evidence of corrosion.

For the purposes of comparison, a boiler of the same kind was cleaned by sandblasting and, without the formation of an adhesion layer, it was coated in precisely the same way with the epoxide resin varnish. The test in boiling water showed a resistance of only 14 days. After six weeks, the boiler was completely useless due to the numerous areas of corrosion and loosening and/or peeling of the coating.

The superiority of a coating on a spinel crystalline adhesion layer provided in accordance with the invention over a coating of the same kind but without an adhesion layer, can also be shown by electrical measurement of the insulation resistance of the coatings. In the present case, the container or boiler on the surface of which the adhesion layer was produced and over which the epoxide resin varnish was applied, had an insulation value or resistance of $3.10^6$ M$\Omega$, measured with a Teraohmmeter, with a testing electrode of 100 mm.$^2$ and a layer thickness of the resin coating of an average of 0.15 mm. The insulation value or resistance was unaltered after boiling for a period of 8 hours.

On the other hand, the same layer thickness of the same coating on a sheet or plate of the same kind, but applied without a spinel layer, showed even after a boiling time of 5 minutes a decrease of the insulation value or resistance to $3.10^5$ M$\Omega$, after 10 minutes a further decrease to $2$–$3.10^4$ M$\Omega$, after 15 minutes yet a further decrease to $2.10^3$ M$\Omega$ and after 30 minutes boiling time the insulation value or resistance was below $2.10^2$ M$\Omega$.

In the drawing is disclosed a product produced in accordance with Example 1. The word legends under the drawing are self-explanatory.

*Example 2*

The surface of a container made of cold-rolled iron sheet was degreased and blanched or pickled bright with 1.5-normal hydrochloric acid. The container was then treated for 5 minutes at room temperature with a pickling solution, containing 1 mole $HNO_3$ and ½ mole $Zn(NO_3)_2$ per litre, and afterwards it was washed with water and dried. A surface layer consisting of $Fe(ZnO_4)$ having a spinel crystalline structure and a lattice constant of 8.40 was thereby formed. Three coatings of an amine-hardening epoxide resin varnish were applied on this adhesion layer, so producing a protective cover or coating of extraordinary resistance to boiling.

*Example 3*

The surface of a container made of cold-rolled iron sheet was, in the manner described in Example 2, prepared and pickled by 1-normal $HNO_3$ without any further additions. A surface layer consisting of $Fe_3(FeO_4)$ having a lattice constant of 8.41 was thereby formed, which ensured that the epoxide resin varnish applied thereon had an outstanding diffusion-resistance.

*Example 4*

A container made of aluminium was degreased, filled with water to which was afterwards added that quantity of concentrated nitric acid required to give a 1% solution. The container was heated and its contents brought to the boil. After one hour the container was emptied, thoroughly washed and dried. The inner surface of the container was coated with a very thin layer of aluminium oxide having a spinel crystalline structure. Upon the adhesion layer so formed, an air-drying and amine-hardening epoxide resin varnish was applied. After boiling for weeks, the surface layer did not show any defects. In comparison, two aluminum containers, one of which had an anodically oxidated surface, were coated with the same epoxide resin varnish without the previous formation of a spinel adhesion layer. Even after boiling for only 15–30 minutes the coatings had begun to peel or separate.

Example 5

An aluminium sheet, after being degreased was treated for one hour in the cold with a pickling solution which contained 1 mole $HNO_3$ and ½ mole $Mg(NO_3)$ per litre. An adhesion layer of $Al_2(MgO_4)$ having a spinel crystalline structure and a lattice constant of 8.09, was thereby produced. When $Zn(NO_3)_2$ and $Mn(NO_3)_2$ were each used separately instead of the $Mg(NO_3)_2$ in the pickling solution in an amount of ½ mole per litre, the spinels $Al_2(ZnO_4)$ with a lattice constant of 8.10 and $Al_2(MnO_4)$ with a lattice constant of 8.26 were produced on the aluminium sheets respectively. All of these layers constitute outstanding adhesion layers, upon which epoxide resin varnishes exhibit extraordinarily diffusion-resistance.

The coatings or coverings according to the invention can be produced upon any kind of support. The production of an adhesion layer by spraying or metallization with liquid aluminium may be carried out on supports of, for example, concrete, walling, brickwork, wood or metal. The production of the adhesion layer by pickling or treatment with an oxidising liquid, is, however, only possible with metallic supporting materials.

What I claim is:

1. A process for the production on a metallic support of a diffusion-resistant protective coating, based on an epoxide resin having two terminal epoxide groups, which comprises providing the metallic support with an oxidic adhesion layer having a spinel-like crystalline structure with a lattice constant of approximately from 8 to 8.5, and applying on the adhesion layer a coating of a bis(4-hydroxyphenyl)-2,2'-propane-epichlorhydrin reaction product.

2. A process for the production of a protective coating on a metallic surface which comprises spraying on to the metallic surface in the presence of oxygen a liquid metal being capable of forming an oxidic adhesion layer having a spinel-like crystalline structure having a lattice constant of approximately from 8 to 8.5 and applying on said layer a coating of a bis(4-hydroxyphenyl)-2,2'-propane-epichlorhydrin reaction product.

3. A process according to claim 2, in which the metal sprayed on to the metallic surface is aluminium and the layer formed thereby consists essentially of $\gamma$-$Al_2O_3$.

4. A process according to claim 2, in which the metal sprayed on to the metallic surface is iron and the layer formed thereby consists essentially of $\gamma$-$Fe_2O_3$.

5. A process for the production of a protective coating on a metallic support which comprises pickling the surface of the support with diluted nitric acid to form on to said surface an oxidic adhesion layer having a spinel-like crystalline structure with a lattice constant of approximately from 8 to 8.5 and applying on said layer a coating of a bis(4-hydroxyphenyl)-2,2'-propane-epichlorhydrin reaction product.

6. A process according to claim 5 in which a support consisting essentially of an iron alloy is used.

7. A process according to claim 5, in which the pickling liquor contains a salt of a metal selected from the groups of metals being capable to form with the metal of the support an oxidic adhesion layer of the type $A_2BO_4$, wherein the symbols A and B represent different metals and one of which represents also the metal of the support, said layer having a spinel-like crystalline structure with a lattice constant of approximately from 8 to 8.5.

8. A process according to claim 7, in which the metallic support consists essentially of iron and the pickling liquor contains diluted nitric acid and $Zn(NO_3)_2$.

9. A process according to claim 7, in which the metallic support consists essentially of aluminium and the pickling liquor contains diluted nitric acid and a nitrate selected from the group consisting of $Zn(NO_3)_2$ and $Mn(NO_3)_2$ and $Mg(NO_3)_2$.

References Cited in the file of this patent

UNITED STATES PATENTS

| | | |
|---|---|---|
| 2,171,545 | Edwards et al. | Sept. 5, 1939 |
| 2,487,137 | Hoover et al. | Nov. 8, 1949 |
| 2,662,034 | Mason et al. | Dec. 8, 1953 |
| 2,703,765 | Osdal | Mar. 8, 1955 |
| 2,707,691 | Wheildon | May 3, 1955 |
| 2,748,030 | Silversher et al. | May 29, 1956 |
| 2,762,724 | Brennan | Sept. 11, 1956 |

FOREIGN PATENTS

| | | |
|---|---|---|
| 655,891 | Great Britain | Aug. 8, 1951 |